United States Patent
Grochowski

[11] Patent Number: 5,667,454
[45] Date of Patent: Sep. 16, 1997

[54] POWER TRANSMISSION

[75] Inventor: Edwin Thomas Grochowski, Howell, Mich.

[73] Assignee: General Motors Corporation, Detroit, Mich.

[21] Appl. No.: 618,410

[22] Filed: Mar. 15, 1996

[51] Int. Cl.⁶ .................................................. F16H 3/64
[52] U.S. Cl. .................................. 475/205; 475/206
[58] Field of Search ........................... 475/200, 204, 475/205, 206

[56] References Cited

U.S. PATENT DOCUMENTS 5,203,749  4/1993  Ito .................................... 475/204

*Primary Examiner*—Dirk Wright
*Attorney, Agent, or Firm*—Donald F. Scherer

[57] ABSTRACT

A power transmission has coaxially aligned input and output shafts. The shafts are interconnected by a multi-speed transmission and the output shaft is connected to a final drive mechanism through a pair of meshing gear members. A planetary reversing gear arrangement is connected between the input and output shafts for reversing the rotational direction from the input shaft prior to delivery to the final drive mechanism.

2 Claims, 2 Drawing Sheets

POWER TRANSMISSION

TECHNICAL FIELD

This invention relates to power transmissions, and more particularly, to multi-speed planetary transmissions utilized in transverse drive applications.

BACKGROUND OF THE INVENTION

Transverse drive transmissions have a drive mechanism, either chain or gearing, to transfer the power from the engine axis to the output axis. When the torque converter is on the engine axis and the planetary gear arrangement is on the output axis, a chain drive is generally used to join the two axes. When the planetary gearing torque converter and engine are on the same axis, the transfer gear assembly is often used to transfer rotation and power to the output shaft. Transmissions of this type have also suggested using a chain drive between the planetary output and the transmission final drive.

When a transfer gear drive mechanism is used, an idler gear is employed to provide the proper rotation direction for the forward and reverse drives. The idler gear use causes an increase in the distance between the two axes and they also affect the overall size of the transmission housing. The idler gear also requires that accommodations be made for supporting the idler gear within the transmission housing.

In some transmission designs, the third axis, that is the idler gear axis, is also used or shared with a third axis for the gearing. However, the idler gear type design is usually less space efficient than a two axis design. Also, the alignment of three parallel axes is usually more difficult than that of two parallel axes.

In the prior art, the use of a chain drive between various gear elements has eliminated the need for the third axis, however, the use of a chain drive determines the load carrying capacity of the transmission. In some instances, it may be desired to provide higher torque and power transmission than the chain drive is designed to accept, in which case, the gear system is utilized.

SUMMARY OF THE INVENTION

It is an object of this invention to provide an improved power transmission for use in transversely mounted automatic drive transmissions.

In one aspect of this invention, the engine output speed and rotation is transferred directly to a torque converter which supplies the power to the planetary gear unit. Coaxial with the torque converter is a fixed reversing planetary gear set which reverses the rotational direction of the input power prior to being attached or directed to the planetary gear unit. The planetary gear unit modifies the speed and torque while maintaining the power essentially the same prior to delivery to a final drive unit, such as a differential. The final drive unit or differential is on an axis spaced from the axis of the planetary gear unit and the torque converter. The method of power from the planetary gear unit to the final drive is via a pair of meshing gears. By reversing the input drive to the transmission, the transfer gears do not need an idler prior to delivery of power to the differential.

Figure 1:
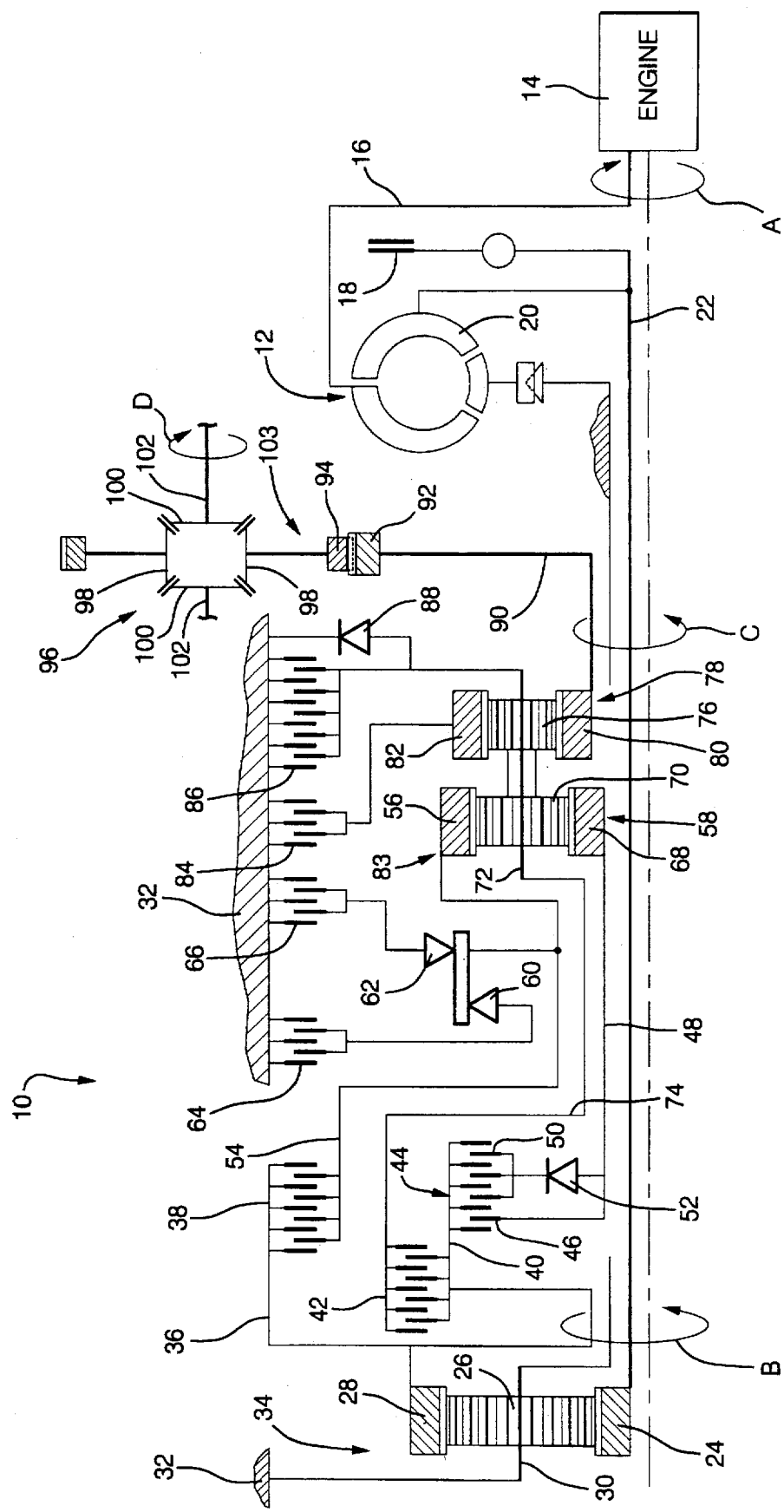
FIG. 1 is a schematic representation of a transmission incorporating the present invention.

Referring to the drawings, there is seen in FIG. 1 a power transmission generally designated 10 which is coupled with a torque converter 12 which in turn is driven by a conventional internal combustion engine 14. The engine 14 and torque converter 12 are interconnected by an input shell 16 which cooperates with a torque converter clutch 18 to provide a direct drive between the engine and the power transmission 10. The torque converter 12 has a turbine 20 which, like the clutch 18, is connected to a transmission input shaft 22.

The transmission input shaft 22 is connected to a sun gear 24 meshes with a plurality of pinions such as 26, which in turn mesh with a ring gear 28. The pinions 26 are rotatably mounted on a carrier assembly 30 which is secured to a transmission case or housing member 32.

Since the sun gear 24, pinions 26 and ring gear 28 provide a simple planetary gear unit 34 in which the carrier 30 is a fixed reaction, the rotation of the input shaft 22, as indicated by Arrow A, is reversed at the ring gear 28, as indicated by the Arrow B. In common parlance, the engine or output rotation of Arrow A is clockwise while the rotation of Arrow B is counterclockwise.

The ring gear 28 is connected to a hub 36 which forms one member of a reverse clutch 38. The ring gear 28 is also connected to a second hub 40 which is one member of a 3-4-5 clutch 42 and a 1-2-3 clutch 44. The 1-2-3 clutch 44 has two separate clutches 46 and 50, clutch 46 when engaged provides a positive drive between the hub 40 and a shaft 48. Clutch 50 cooperates with a one-way device 52 which provides a drive connection to the shaft 48 which may be overrun in a direction opposite to the direction of Arrow B.

The clutch 38 has an inner hub 54 which is drivingly connected with a ring gear 56 which is a member in a planetary gear set 58. Also connected to the hub 54 is a pair of one-way devices 60 and 62. The one-way device 60 is connected to the ground element or transmission case 32 through a conventional brake 64 and the one-way device 62 is connected through a conventional brake 66 which is also connectible with the housing 32.

The shaft 48 is drivingly connected with a sun gear 68 which is a component in the planetary gear set 58. Also included in the planetary gear set 58 is a plurality of pinion gears 70 rotatably mounted on a carrier 72 which is connected through a hub and shaft 74 with the clutch 42. The carrier 72 also supports a plurality of pinion gears 76 which are components in a planetary gear set 78. Also included within the planetary gear set 78 is a sun gear 80 and a ring gear 82 which are in meshing relationship with the pinions 76. The planetary gear sets 58 and 78 are interconnected by the carrier 72 to provide a five speed planetary arrangement generally designated 83.

The ring gear 82 is connectible through a brake 84 with the housing 32 and the carrier 72 is connected with the housing 32 through a brake 86 and a one-way device or brake 88. The sun gear 80 is drivingly connected through an output hub 90 which is rotatably supported on an axis parallel to the axis of shaft 22. The hub 90 has secured therewith a transfer gear 92 which meshes with a transfer gear 94.

The transfer gear 94 drives the casing or housing of a bevel gear differential 96. The housing of the differential 96 rotatably supports a pair of side gears 98 which mesh with output gears 100. Each output gear 100 has connected therewith an output shaft 102. Thus, the power of engine 14 is delivered via the torque converter 12 or clutch 18 to the input shaft 22 which has the rotational direction of power flow reversed by the planetary gear arrangement 34 prior to delivery through selective engagement of the conventional clutches and brakes to the planetary gear sets 58 and 78. The planetary gear sets 58 and 78 are individually operable to provide power to the transfer gearing 92, 94 which in turn provides the rotational power to the output shafts 102. The planetary gear arrangement 83, through selective operation of the clutches and brakes will provide five forward speeds and one reverse speed. The differential 96 and transfer gears 92, 94 cooperate to provide a final drive mechanism generally designated 103.

The forward speeds will rotate the hub 90 in the same direction as Arrow B which will impose the opposite rotation on the output shafts 102. As can be seen through that analysis, the output shafts 102 will rotate forward in the direction of Arrow A (clockwise). The reverse gear unit or gear ratio of the planetary gear sets 58 and 78 will result in the opposite direction of rotation at gear 92 from the input Arrow B which will result in the output shafts 102 being rotated counterclockwise the same as Arrow B.

Figure 2:
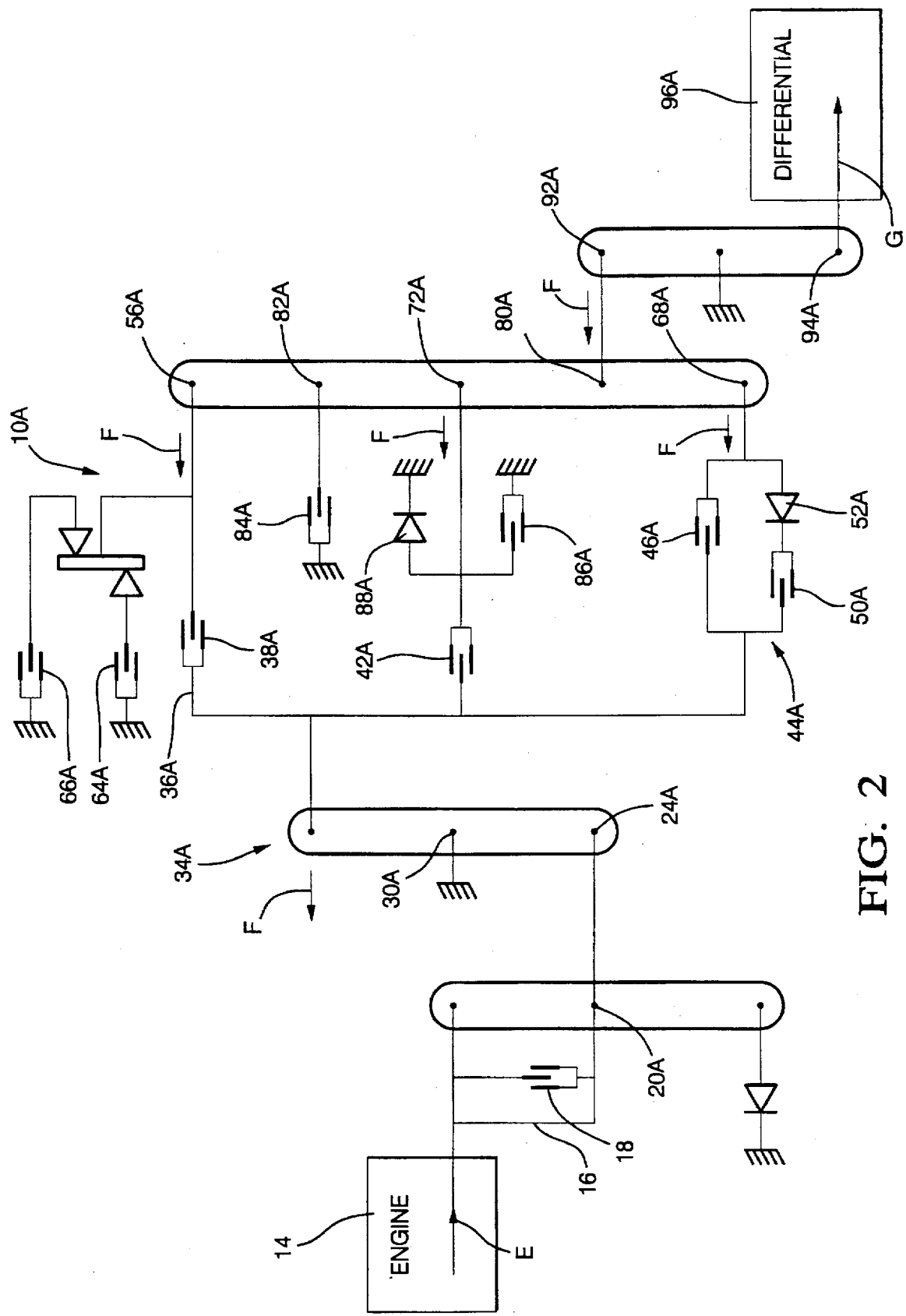
FIG. 2 is a lever diagram of the gearing shown in FIG. 1.

In FIG. 2, the node points on the lever diagram have been given the same numerical designation as their corresponding gear elements on the schematic diagram of FIG. 1. In other words, the sun gear of the reversing planetary 34 is the numeral 24 on FIG. 1 and is the numeral 24A in FIG. 2. Likewise, the corresponding clutches and brakes have been given the numerical designation with an A attachment.

To condition the transmission for the first forward range, the clutch 44 and/or 46 is engaged. This clutch provides a positive drive from the ring gear 28 to the sun gear 68. The carrier element 72 is grounded by the one-way 88 such that the pinion gears 70 and 76 are connected to rotate in unison such that rotation of the sun gear 68 will cause rotation of the sun gear 80 when the carrier 72 is grounded by the one-way device 88 or the brake 86. The brake 86 is applied for low gear operation when engine coast braking is desired. The clutch 46 must also be engagement when engine coast braking is desired.

To establish the second forward ratio, the brake 64 is engaged which will cause actuation of the one-way device 60 which in turn will prevent rotation of the ring gear 56 in a direction opposite to the rotation of sun gear 68. This will result in rotation of the carrier 72 in the direction of Arrow B permitting overruning of the one-way brake 88. The input speed on sun gear 68 and the rotation of the carrier 72 will result in the rotation of the sun gear 80 in the direction of Arrow B. The rotation of the sun gear 80 will be delivered to the differential arrangement 96 where the output shafts 102 will be turned or rotated in the direction of Arrow B which is the same as forward or input direction of the engine 14.

To establish the third forward ratio, the clutch 42 is engagement thus providing a drive in the direction of Arrow B to both the carrier 72 and the sun gear 68 resulting in the planetary gear set being driven as a unit in the direction of Arrow C. Rotation of the ring gear 56 in this direction will permit overruning of the one-way device 60. Third gear is a direct drive ratio which turns the transmission output in the direction of Arrow C and the output shafts 102 in the direction of Arrow D. The speed ratio between the sun gear 80, the output of the transmission, and the rotation of the output shafts 102 is, of course, determined by the ratio between the gears 92 and 94. It should be appreciated that the rotational speed of Arrows D and C in the direction of the drive are less in value than the rotation of Arrow A because of the planetary reversing set 34. This planetary gear set is not only a reversing gear set, it is also a reducing gear set. That is, the speed of ring gear 28 is reduced from the speed of sun gear 24 by the ratio of the number of teeth on the respective gear members. For example, the ring gear 28 may have ninety teeth and the sun gear 24 have thirty teeth resulting in a 3:1 reduction drive. Thus, the final drive determined by the gears 92 and 94 can be less than what might normally be associated with such transfer gear members.

To establish the fourth drive ratio, the brake 66 is engaged and if the clutch 46 had been engaged, it would be released at this time, however, the clutch 46 was probably not engaged if the first gear coasting was not required. The engagement of brake 66 will prevent rotation of the ring gear 56 in the same direction as the carrier 72. This will result in the ring gear 56 being a reaction member and the carrier 72 being an input member. This combination will provide an overdrive ratio to the sun gear 80 such that the speed of the transmission output in the direction of Arrow C will be greater than the speed of the input at Arrow B. Again, the output speed and torque of the transmission is directed via the transfer gearing to the output shafts 102.

The fifth and highest drive ratio is established by engagement of the brake 84. This causes the ring gear 82 to become a reaction member in the planetary gear arrangement. The carrier 72 continues to be the input member such that an overdrive ratio between the ring gear 82 and sun gear 80 is established. The ratio of this overdrive is such that the sun gear 80 rotates faster. The pinion gears 76 and 70 also rotate faster but in a direction opposite to the rotation of carrier 72 such that the ring gear 56 will now overrun the brake 62. In the fifth ratio, the brake 64 has been released.

Thus, it can be seen that with the selective manipulation of the clutches and brakes, five forward speeds are established between the input shaft 22 and the final drive output shafts 102. It is also apparent that the rotational direction of the engine power is changed after leaving the engine and prior to being transferred to the final drive mechanism 103.

To establish the reverse drive ratio, the clutch 38 is engaged and the brake 86 is engaged. All other devices are released. The rotation of ring gear 28 in the direction of Arrow B is transmitted to the ring gear 56 in the direction of Arrow B. The carrier 72 is held stationary by the brake 86 such that the rotation of the ring gear 56 is transmitted via the pinion gears 70 and 76 to the sun gear 80. However, the sun gear 80 will rotate in a direction opposite to the ring gear 56 which is also in a direction opposite to the Arrow C. This is the reverse rotation output direction.

As is evident from viewing the Arrows B and C, rotation of the sun gear 80 opposite to Arrow C will be the same as the direction of Arrow A which will result in the output shafts rotating in a direction opposite to the Arrow D thereby providing reverse drive direction at the outputs shafts.

The planetary gear sets 58 and 78 are shown as two simple interconnected planetaries that are interconnected by both the carrier and pinion gears. Various other types of gearing arrangements can be utilized such as Ravigneaux gearing or the gearing commonly known as the Simpson gearing which is currently used in many three speed transmissions. The Ravigneaux gear sets are, of course, are well known structure and can provide anywhere from three to six speed depending upon the complexity of the gearing one desires to utilize.

The lever diagram of FIG. 2 is also a depiction of the speed directions during the various ratios. For example, if the engine direction is that shown by Arrow E, the ring gear speed direction will be that shown by Arrow F. Thus, the sun gear 68A will also have a direction of the Arrow F when the clutches 44A or 46A are applied as will the carrier 72A when the clutch 42A is applied and as will the ring gear 56A when the clutch 38A is applied.

When the sun gear 68A has a speed component direction of Arrow F and either of the ring gears or the carrier are connected to ground, the sun gear 80A will also have a speed component in the direction of Arrow F and the differential output will have a speed component in the direction of Arrow G which is identical with the direction of Arrow E of the engine. Whenever the carrier 72A is input and the sun gear 68A is also input, the input direction of sun 80A will be in the direction of Arrow F at a speed determined by the reduction of the gear unit 34A.

The carrier 72A has a speed component in the direction of Arrow F and either of the ring gears 56A or 82A are grounded, the sun gear 80A will have a speed component in the direction of Arrow F which will be greater than the speed component of the carrier 72A. The differential 96A will again have an output in the direction of Arrow G.

However, when the ring gear 56A has an input speed in the direction of Arrow F and the ring gear 82A is connected to ground by the brake 84A, the sun gear 80A will have a speed component opposite to the direction of Arrow F since the node point, represented by sun gear 80A, is on the opposite side of the fulcrum point, represented by ring gear 82A. The gearing 92A and 94A will reverse the direction of the speed of sun gear 80A resulting in an output of the differential 96A being in a direction opposite of Arrow G.

The use of lever diagrams illustrates quite well the speed directional component of the various gears within the system. The lever diagram, as is well known, can also be used to illustrate relative speed. For example, if the sun gear 68A has an input speed of unity and the ring gear 56A has a speed of zero, a triangle is formed which will describe the speed of the sun gear 80A. This same analysis can be made with the triangle formed between 68A, 82A and the speed of unity and between the carrier node 72A, 68A and the speed of unity.

What those skilled in the art will recognize is that the reversing of the input speed from the engine prior to delivery to the differential transfer gearing permits the normally used idler gear to be eliminated, thus providing a direct drive connection between the transfer gear members. One of the obvious benefits of this is the amount of torque that can be transmitted from the sun gear 80 or whatever output the transmission has to the differential 96.

The meshing gears will carry substantially more torque than a similarly sized chain mechanism. Thus, the advantage of permitting more power transmission in a given transmission size is a definite benefit of this invention.

I claim:

1. A power transmission comprising:

a power input shaft rotating in a first direction;

a multi-speed planetary gear arrangement disposed coaxial with the power input shaft;

a power output shaft coaxial with said power input shaft;

a final drive assembly having a pair of output shafts;

selectively engageable friction means for establishing a plurality of forward drive ratios in the multi-speed planetary gear arrangement; and planetary reversing means operatively drivingly connected with the multi-speed planetary gear arrangement and coaxially disposed between the input shaft and the output shaft for reversing the direction of rotation from the input shaft prior to delivery to the final drive assembly in all the forward drive ratios.

2. A power transmission comprising:

a power input shaft rotating in a first direction;

a multi-speed planetary gear arrangement disposed coaxial with the power input shaft;

a power output shaft coaxial with said power input shaft;

a final drive assembly having a pair of output shafts;

a plurality of selectively engageable friction means for establishing a plurality of forward drive ratios in the multi-speed planetary gear arrangement; and planetary reversing means operatively drivingly connected between the input shaft and the output shaft for reversing the direction of rotation from the input shaft prior to delivery to the final drive assembly in all the forward drive ratios including a first gear member continuously drivingly connected with the power input shaft, a second gear member continuously drivingly connected with selected ones of the engageable friction means and a third member continuously grounded to a housing.

* * * * *